(12) United States Patent
Call et al.

(10) Patent No.: US 8,486,556 B2
(45) Date of Patent: Jul. 16, 2013

(54) MULTILAYER SEPARATOR EXHIBITING IMPROVED STRENGTH AND STABILITY

(75) Inventors: Ronald W. Call, Rock Hill, SC (US); Lie Shi, Charlotte, NC (US); Zhengming Zhang, Charlotte, NC (US); Shizuo Ogura, Charlotte, NC (US); Xiangyun Wei, Charlotte, NC (US); Premanand Ramadass, Charlotte, NC (US)

(73) Assignee: Celgard LLC, Charlotte, NC (US)

( * ) Notice: Subject to any disclaimer, the term of this patent is extended or adjusted under 35 U.S.C. 154(b) by 0 days.

(21) Appl. No.: 12/755,471

(22) Filed: Apr. 7, 2010

(65) Prior Publication Data
US 2010/0209758 A1   Aug. 19, 2010

Related U.S. Application Data

(63) Continuation of application No. 11/400,465, filed on Apr. 7, 2006, now abandoned.

(51) Int. Cl.
*H01M 2/14* (2006.01)
*H01M 2/16* (2006.01)
*H01M 2/18* (2006.01)

(52) U.S. Cl.
USPC ............ 429/145; 429/129; 429/142; 429/144

(58) Field of Classification Search
USPC ........................................................ 429/145
See application file for complete search history.

(56) References Cited

U.S. PATENT DOCUMENTS

| | | | |
|---|---|---|---|
| 4,335,193 A | 6/1982 | Doi et al. |
| 4,650,730 A | 3/1987 | Lundquist et al. |
| 4,731,304 A | 3/1988 | Lundquist et al. |
| 5,281,491 A | 1/1994 | Rein et al. |
| 5,472,792 A | 12/1995 | Tsurutani et al. |
| 5,480,745 A | 1/1996 | Nishiyama et al. |
| 5,565,281 A | 10/1996 | Yu et al. |
| 5,667,911 A | 9/1997 | Yu et al. |
| 5,691,047 A | 11/1997 | Kurauchi et al. |
| 5,691,077 A | 11/1997 | Yu |
| 5,731,074 A | 3/1998 | Nishiyama et al. |
| 5,952,120 A | 9/1999 | Yu et al. |
| 6,057,060 A | 5/2000 | Yu |
| 6,080,507 A | 6/2000 | Yu |
| 6,180,280 B1 | 1/2001 | Spotnitz |
| 6,232,402 B1 | 5/2001 | Demeuse |
| 6,566,012 B1 | 5/2003 | Takita et al. |

(Continued)

OTHER PUBLICATIONS

Danko et al., "Ionic Resistance Measurements of Battery Separators", Battery Conference on Applications and Advances, 1997., Twelfth Annual, p. 97-98.*

(Continued)

*Primary Examiner* — Barbara Gilliam
*Assistant Examiner* — Steven Scully
(74) *Attorney, Agent, or Firm* — Hammer & Associates, P.C.

(57) ABSTRACT

A multi-layer microporous battery separator which comprises: a high molecular weight polypropylene layer having a melt flow index of $\leq 1.2$ measured at layer; a polyethylene layer; and a high molecular weight polypropylene layer having a melt flow index of $\leq 1.2$ measured at layer. The resulting microporous battery separator which is formed by a dry stretch process produces the microporous battery separator which has a porosity of $\leq 37\%$ while maintaining a gurley from 13-25 seconds and a thickness of $\leq 25$ microns.

2 Claims, 3 Drawing Sheets

U.S. PATENT DOCUMENTS

| | | |
|---|---|---|
| 6,666,969 B1 | 12/2003 | Funaoka et al. |
| 6,824,865 B1 | 11/2004 | Funaoka et al. |
| 6,830,849 B2 | 12/2004 | Lee et al. |
| 2002/0136945 A1* | 9/2002 | Call et al. ............ 429/144 |
| 2003/0072995 A1* | 4/2003 | Nark et al. ............ 429/144 |
| 2005/0031943 A1* | 2/2005 | Call ...................... 429/144 |

OTHER PUBLICATIONS

Danko et al., "Ionic Resistance Measurements of Battery Separators," Battery Conference on Applications and Advances, 12th Annual, (p. 97-98), (1997).

* cited by examiner

MULTILAYER SEPARATOR EXHIBITING IMPROVED STRENGTH AND STABILITY

RELATED APPLICATION

This application claims the benefit of U.S. patent application Ser. No. 11/400,465 filed Apr. 7, 2006, now abandoned.

FIELD OF THE INVENTION

The present invention is a battery separator and a method of making this separator. The invented separator exhibits an increase in mixed penetration tests and in decreased shrinkage when compared to other separators made by either a dry stretch process or solvent extraction process. Surprisingly the separators of the invention also have a Gurley of 13 to 25 seconds even with a porosity of less than or equal to 37%.

BACKGROUND OF THE INVENTION

The use of microporous multi-layered membranes as battery separators is known. See, for example, U.S. Pat. Nos. 5,480,745; 5,691,047; 5,667,911; 5,691,077; and 5,952,120.

U.S. Pat. No. 5,480,745 discloses forming a multi-layered film by co-extruding the multi-layered precursor or by heat-welding, at 152° C., pre-formed precursor layers. The multi-layered precursor, formed by either technique, is then made microporous by annealing and stretching. This membrane, which is made by a dry stretch process, has a preferable amount of net stretch is from 100% to 300%.

U.S. Pat. No. 5,691,047 discloses forming the multi-layered film by co-extruding the multi-layered precursor or by uniting, under heat (120-140° C.) and pressure (1-3 kg/cm$^2$), three or more precursor layers. The precursor formed under heat and pressure, at a speed of 0.5 to 8 m/min (1.6-26.2 ft/min), has a peel strength in the range of 3 to 60 g/15 mm (0.2-4 g/mm). In the examples, one 34 µm separator has a peel strength of 1 g/mm and the other, about 0.5 g/mm. The multi-layered precursor, formed by either technique, is then made microporous by annealing and stretching. The porosity of these separators is greater than the present invention while showing a relatively high Gurley.

U.S. Pat. No. 5,667,911 discloses forming the multi-layered film by uniting (by heat and pressure or by adhesives) cross-plied microporous films to form a multi-layered microporous film. The microporous films are laminated together using heat (110° C.-140° C.) and pressure (300-450 psi) and at line speeds of 15-50 ft/min (4.6-15.2 m/min). This reference teaches lower Gurley values, which is a good indication that the porosity of these films is high.

U.S. Pat. No. 5,691,077 discloses forming the multi-layered film by uniting, by heat and pressure (calendering), or by adhesives, or by pattern welding, microporous films to form a multi-layered microporous film. Calendering is performed at 125° C. to 130° C. for a residence time of 2 to 10 minutes. Four (4) stacked multi-layered microporous precursors are calendering between a single nip roll. The porosity of these separators is greater than the present invention while showing a relatively high Gurley.

U.S. Pat. No. 5,952,120 discloses forming the multi-layered film by extruding nonporous precursors, bonding together nonporous precursors, annealing the bonded, nonporous precursors, and stretching the bonded, nonporous precursors to form a multi-layered microporous film. At least four (4) tri-layer precursors are simultaneously passed through the steps of bonding, annealing, and stretching. Bonding was performed between nip rollers at 128° C. (range 125° C.-135° C.) at a line speed of 30 ft/min (9.1 m/min) to yield a peel strength of 5.7 g (0.2 g/mm) and between nip rollers at 128° C.-130° C. at a line speed of 40 ft/min (12.2 m/min) to yield a peel strength of 30 g/in (1.2 g/mm). The net stretch on these separators all tend to be at least 100% or higher, while the Gurley's are on the high side.

While the foregoing processes have produced commercially viable multi-layered, microporous films suitable for use as battery separators, there is a desire on the part of both the separator manufacturers and the battery manufacturers to produce separators with greater processability. To improve processability a separator needs be more resistant to failure during the manufacture process. Two of the big problems that plague the battery manufactures are leaks and shrinkage of the separator. Shrinkage occurs when the separator is subjected to a heated environment, which a battery will go through during use. In the past one way separators had been tested for leaks was through a puncture strength test. However, it has been learned that a new test called mixed penetration, is by far a better indicator of how a separator will do in the manufacturing process than the puncture strength test. When testing for shrinkage the separator needs to be exposed to elevated heat over a time period. The manufactures of the batteries will still demand that the separators have Gurley numbers in a desirable range Accordingly, there is a need to provide an improved multi-layered microporous films to be used as separators, which shows an increase in mixed penetration strength, while still maintaining low shrinkage values, and still exhibiting Gurley numbers in a desirable range.

SUMMARY OF THE INVENTION

The invention is a multi-layer microporous battery separator, having a high molecular weight polypropylene layer, indicated by a melt flow index of $\leq 1.2$ measured at the layer, a polyethylene layer, and a high molecular weight polypropylene layer, which has a melt flow index of $\leq 1.2$ measured at layer. This resulting microporous battery separator is formed by a dry stretch process. The microporous battery separator has a porosity of $\leq 37\%$ while maintaining a gurley from 13-25 seconds for a separator with a thickness of $\leq 25$ microns.

BRIEF DESCRIPTION OF THE DRAWINGS

The foregoing will become more readily apparent by referring to the following detailed description and the appended drawings in which.

DETAILED DESCRIPTION OF THE INVENTION

Figure 1:
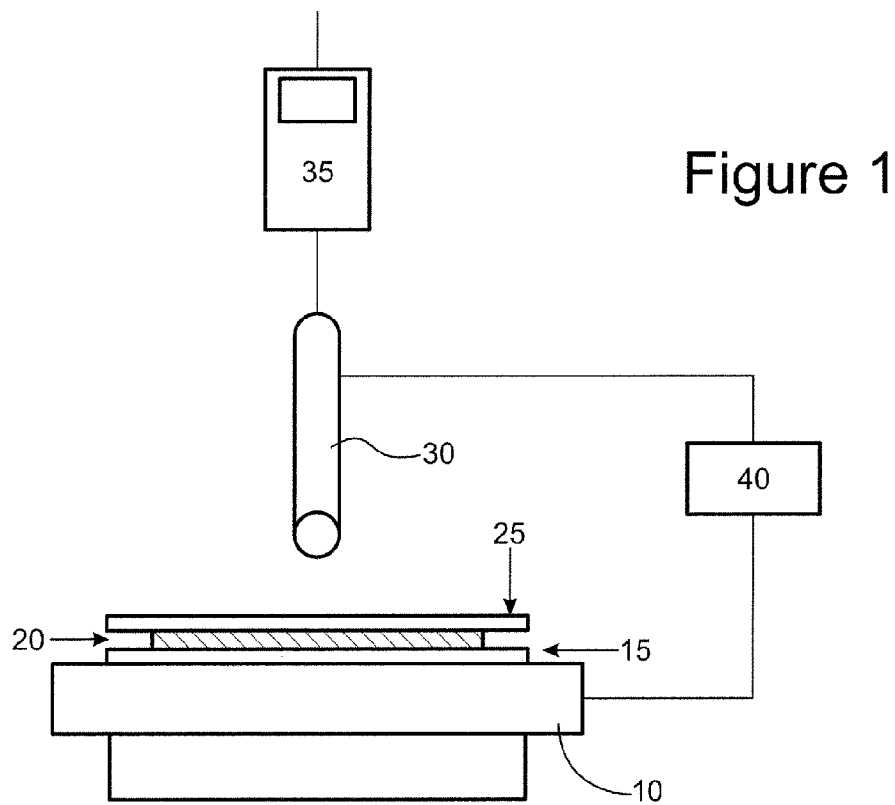
FIG. 1 is a side view of a multilayer separator in a mixed penetration test.

A battery separator refers to a microporous film or membrane for use in electrochemical cells or capacitors. Electrochemical cells include primary (non-rechargeable) and secondary (rechargeable) batteries, such as batteries based on lithium chemistry. These films are commonly made of polyolefins, for example, polyethylene, polypropylene, polybutylene, polymethylpentene, mixtures thereof and copolymers thereof. Polypropylene (including isotactic and atactic) and polyethylene (including LDPE, LLDPE, HDPE, and UHMWPE) and blends thereof and their copolymers are the preferred polyolefins that are used to make commercially available films for these applications. These films may be made by the CELGARD® process (also known as the dry process, i.e., extrude-anneal-stretch) or by a solvent extraction process (also known as the wet process or phase inversion process or TIPS, thermally induced phase separation, process) or by a particle stretch process. Some of these films, those made by the dry process, are often multi-layered films. Multi-layered films are preferred because they have shutdown capability (i.e., can stop the flow of ions in the event of short circuiting). A common multi-layered film is the tri-layered film. A popular tri-layered film has a polypropylene (PP)/polyethylene (PE)/polypropylene (PP) structure, another structure is PE/PP/PE.

The present invention is to a multi-layer microporous battery separator which has three layers. The first layer is a high molecular weight polypropylene layer having a melt flow index of less than or equal to ($\leq$) 1.2 measured at layer, a second polyethylene layer, and a third high molecular weight polypropylene layer, which has a melt flow index of $\leq$1.2 measured at the layer. This microporous battery separator is formed by a dry stretch process. The process of the invention produces the microporous battery separator which has a porosity of less than or equal to $\leq$37% while maintaining a Gurley from 13-25 seconds and a thickness of less than or equal to $\leq$25 microns.

This multi-layer microporous battery separator exhibits an increase of 5% or more in mixed penetration strength compared to a tri-layer dry-stretched microporous battery separator of the same thickness. The net shrinkage of this microporous battery separator is less than 5% after an exposure of 6 hours at 105° C. The ionic resistance of this microporous battery separator is less than 2.5 ohms-cm$^2$. The polyethylene layer of this separator is a high density polyethylene.

In another embodiment of the invention the multi-layer microporous battery separator comprises a tri-layer dry-stretched microporous battery separator, which has an outer polyolefin layer, an inner polyolefin layer and an outer polyolefin layer. The overall thickness of the separator is $\leq$25 microns. The outer polyolefin layers are a high molecular weight polypropylene. The inner polyolefin layer is a polyethylene. This tri-layer dry-stretched microporous battery separator, exhibits an increase in mixed penetration strength of 5% or more compared to a tri-layer dry-stretched microporous battery separator of the same thickness. This multi-layer microporous battery separator has a porosity of $\leq$37% while maintaining a gurley from 13-25 seconds. Surprisingly, the net shrinkage of this microporous battery separator is less than 5% measured for 6 hours at 105° C. This multi-layer microporous battery separator has an ionic resistance of less than 2.5 ohm-cm$^2$.

Another embodiment of the invention is a multi-layer microporous battery separator which comprises a tri-layer dry-stretched microporous battery separator. This separator has an outer polyolefin layer an inner polyolefin layer and an outer polyolefin layer. The outer polyolefin layers are a high molecular weight polypropylene. The inner polyolefin layer is a polyethylene. This tri-layer dry-stretched microporous battery separator has a thickness of $\leq$25 microns, a porosity of 37% or lower and a Gurley from 13-25 seconds. This separator exhibits a 5% increase in mixed penetration strength compared to a tri-layer dry-stretched microporous battery separator of the same thickness. This multi-layer microporous battery separator surprisingly exhibits a net shrinkage of less than 5% measured for 6 hours at 105° C. The multi-layer microporous battery separator also has an ionic resistance of the microporous battery separator is less than 2.5 ohm-cm$^2$.

The invented separator can be prepared by the following process of the preparation of a multi-layer microporous battery separator. A polypropylene having a MFI$\leq$1.0 measured at pellet before processing and a polyethylene is provided. The polypropylene, which is a high molecular weight polypropylene, is extruded to form a precursor polypropylene film. Then a polyethylene is provided and is extruded to form a precursor polyethylene film. The precursor polypropylene films are then laminated to each side of the precursor polyethylene film to form a non-porous tri-layer precursor. This non-porous tri-layer precursor is then annealed. After annealing, the non-porous tri-layer precursor is then stretched to form a stretched microporous tri-layer film. The stretched microporous tri-layer film is then allowed to relaxed to form a microporous tri-layer film. The net stretch in this process is less than 90%. Net stretch is determined by the percentage of stretch given to the film minus the amount relax. Stretch may be done either hot or cold or as mixture of hot and cold. The relaxation may also be performed either hot or cold or as a mixture of both hot and cold.

In another embodiment of the invention a battery separator made of a microporous polyolefin is provided, which has an overall thickness of $\leq$25 microns, where the net shrinkage of the separator is less than 5% measured for 6 hours at 105° C. This battery separator has a porosity of 37% or lower. Yet surprisingly this battery separator has a Gurley from 13-25 seconds. Traditionally in order to obtain a Gurley level in the 13-25 second range a separator had to have a porosity of more than 37% and in most cases the porosity was at least 40% or more. It has been seen that even small changes in porosity tend to have a big impact of the Gurley for a separator. A battery separator made of a microporous polyolefin having an overall thickness of $\leq$25 microns, where the net shrinkage of the separator is less than 5% measured for 6 hours at 105° C., where the separator has a porosity of $\leq$37% while maintaining a gurley from 13-25 seconds is surprising for a separator made by a wet process as well as a separator made by a dry process.

In another embodiment of the invention a multi-layer battery separator is made of a microporous polyolefin having an outer layer of a high molecular weight polypropylene layer, which has a melt flow index of $\leq$1.2 measured after processing at the outer layer. The measurement at the layer is important because many polypropylenes that may be referred to as high density will see a significant fall off in the melt flow performance after processing. In the past when melt flow index was used it always referred to the melt flow prior to processing.

This invention is further illustrated with reference to the examples set forth below. In the following example, Gurley is measured by the ASTM D-726(B) method. As used herein, Gurley is the resistance to air flow measured by the Gurley Densometer (e.g. Model 4120). The Gurley values set forth herein are expressed as the time in seconds required to pass 10 cc of air through one square inch of product under a pressure 12.2 inches of water.

The tensile strength along MD and TD is measured with the ASTM D-638 method. The tear resistance is measured by ASTM D-1004.

The thickness of the battery separator is measured by the T411 om-83 method developed under the auspices of the Technical Association of the Pulp and Paper Industry. Thickness is determined using a precision micrometer with a ½ inch diameter, circular shoe contacting the sample at seven (7) psi. Ten (10) individual micrometer readings taken across the width of the sample are averaged.

The porosity of a microporous film is measured by the method of ASTM D-2873.

Puncture strength is measured as follows: ten measurements are made across the width of the stretched product and averaged. A Mitech Stevens LFRA Texture Analyzer is used. The needle is 1.65 mm in diameter with 0.5 mm radius. The rate of descent is 2 mm/sec and the amount of deflection is 6 mm. The film is held tight in the clamping device with a central hole of 11.3 mm. The displacement (in mm) of the film that was pierced by the needle was recorded against the resistance force (in gram force) developed by the tested film. The maximum resistance force is the puncture strength.

Figure 2:
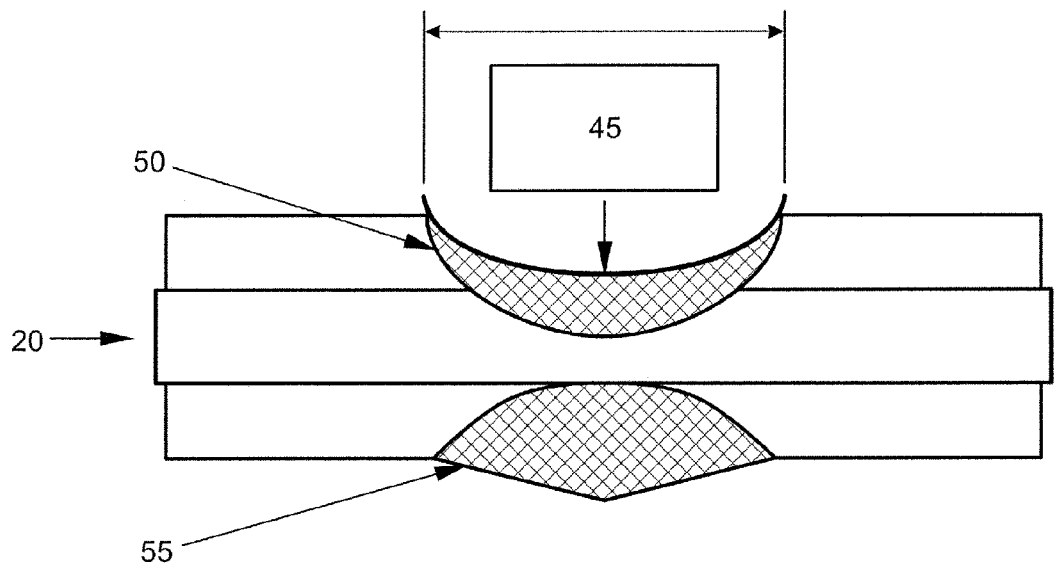
FIG. 2 is side view showing the electrodes and the separator after pressure is applied.

Mixed penetration is the force required to create a short through a separator due to mixed penetration. In this test one starts with a base of a metal plate 10, FIG. 1, on top of this plate is placed a sheet of cathode material 15, on top of cathode is placed a multilayer separator 20 and on top of the multilayer separator 20 is placed a sheet of anode material 25. A ball tip of 3 mm, 30 is then provided attached to a force gauge 35. The ball tip 30 is connected to the metal plate 10 by a resistance meter 40. Pressure 45, FIG. 2, is applied to the ball tip 30, which is recorded on the force gauge 35, FIG. 1. Once force is applied, there builds up an anode mix 50, FIG. 2 and a cathode mix 55 on either side of the separator 20. When the resistance falls dramatically it indicates a short through the separator due to mixed penetration.

Mixed penetration measures the strength of the separator and resistance towards mixed penetration. This has been found to more accurately simulate the behavior of a real cell. It is a better indicator than puncture strength of how a separator will behave in a cell. This test is used to indicate the tendency of separators to allow short-circuits during battery assembly.

Melt Index is measured according to ASTM DS 1238; PE: 190° C./2.16 Kg; PP: 230° C./2.16 Kg. It is measured as g/10 minutes.

The shrinkage is measured at 105° C. for 6 hours. Both width and length of a separator membrane are measured before and after the said heat treatment. The net shrinkage is calculated by the following formula:

Net Shrinkage percent=100*((L0−L1)/L0+(W0−W1)/W0)

Where L0 is the length before heat treatment, L1 is the length after heat treatment, W0 is the width before heat treatment, and W1 is the width after heat treatment.

The measurement ionic resistance of separator soaked with a certain electrolyte is very important to the art of battery manufacture, because of the influence the separator has on electrical performance. Ionic resistance is a more comprehensive measure of permeability than the Gurley number, in that the measurement is carried out in the actual electrolyte solution for real battery application. The ionic resistance of the porous membrane is essentially the ionic resistance of the electrolyte that is embedded in the pores of the separator. Typically, a microporous separator, immersed in an electrolyte has an electrical resistance about 6-7 times that of a comparable volume of electrolyte, which it displaces. It is a function of the membrane's porosity, tortuosity, the resistance of the electrolyte, the thickness of the membrane, and the extent to which the electrolyte wets the pores of the membrane.

The separator resistance is characterized by cutting small pieces of separators from the finished material and then placing them between two blocking electrodes. The separators are completely saturated with the battery electrolyte with 1.0M $LiPF_6$ salt in EC/EMC solvent of 3:7 ratio by volume. The resistance, R ($\Omega$) of the separator is measured by 4-probe AC impedance technique. In order to reduce the measurement error on the electrode/separator interface, multiple measurements are needed by adding more separator layers.

Figure 3:
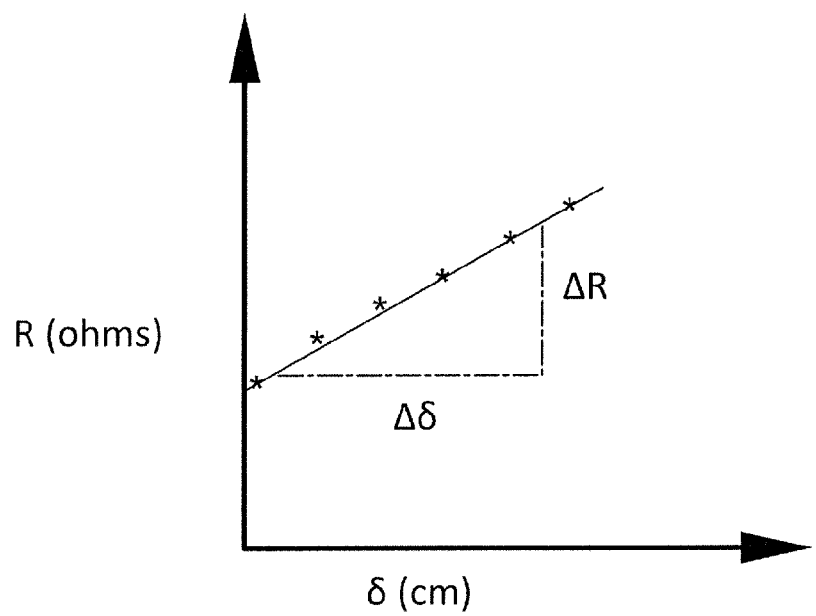
FIG. 3 is a graph showing a slope of the ionic resistance of a separator.

Based on the multiple layer measurements, the ionic resistance, Rs ($\Omega$) of the separator saturated with electrolyte is then calculated by the formula, $$R_s = \frac{\rho_s l}{A} \qquad (1)$$

where $\rho_s$ is the ionic resistivity of the separator in $\Omega$-cm, A is the electrode area in $cm^2$ and l is the thickness of the separator membrane in cm. The ratio $\rho_s/A$ is the slope calculated for the variation of separator resistance with multiple separator layers which is given by, $$\text{slope} = \frac{\rho_s}{A} = \frac{\Delta R}{\Delta \delta} \qquad (2)$$

where $\Delta R$ and $\Delta \delta$ are defined in the FIG. 3. Calculation of slope in FIG. 3 is used to estimate the ionic resistance of separator membrane using multiple layer measurement approach.

Figure 4:
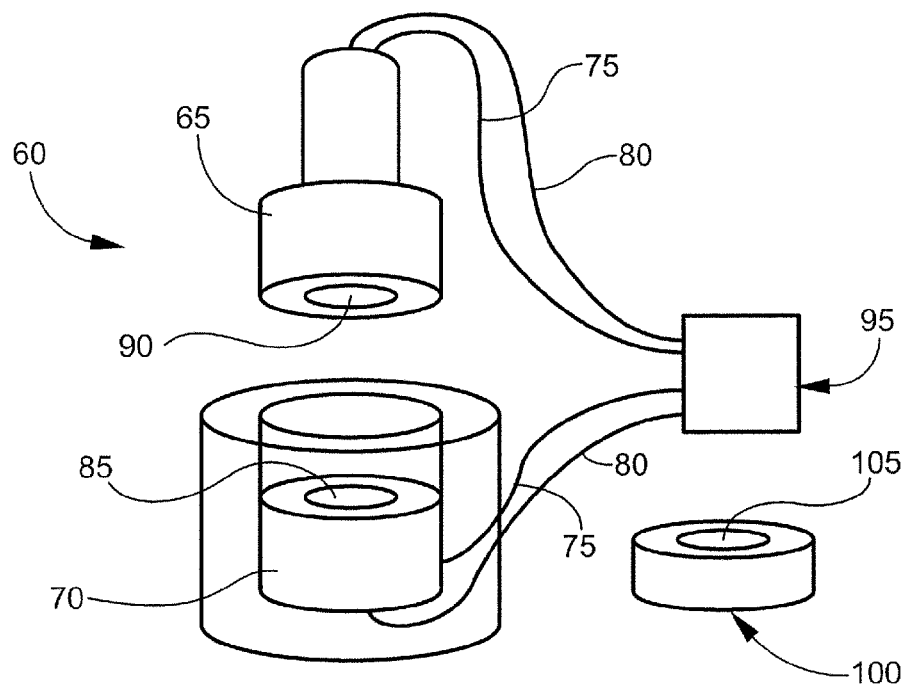
FIG. 4 is a schematic view of a four probe AC impedence technique for measuring the ionic resistance of separator membranes.

Ionic resistance of separator membranes is measured by using a four probe AC impedance technique. FIG. 4 shows the schematic 60 of the cell used to measure the resistance. The lead coming out of the top 65 and bottom 70 probes of the cell has two wires each 75, 80 one for sensing current and other for voltage. Electrolyte used for all resistance measurement is 1.0 M LiPF6 salt in EC:EMC solvent of a 3:7 ratio by volume. Place a sample of separator on the bottom electrode 85. The separator should completely cover the bottom electrode and the separator should be completely wet with electrolyte. Then slide the second electrode 90 on top of the bottom electrode 85 and measure the impedance value. The impedance value is measured with an impedance meter 95 from Potentiostat. Start adding more separator layers and measure cumulative resistance in order to reduce the measurement error. It is possible to test the resistance of just the electrolyte by adding a Teflon spacer 100 which has a hollow center 105 which can be placed over the bottom probe 70. Then electrolyte is added to fill the hollow center 105 then the top probe 65 is placed over the spacer 100.

EXAMPLES

The description above will be clear when one looks at the examples in Table A. Sample A & B are for a competitive trilayer separator made by a dry stretch process. Sample A is a 20 micron separator sample B is for a 25 micron separator. Examples C300 and C500 are for the invented separator made by the invented process. C300 is a 20 micron separator and C500 is for a 25 micron separator. In the table: IR stands for ionic resistance, P.S. is puncture strength, MP is mixed penetration and TD is traverse direction compared to the machine direction.

TABLE A

| Description | A | C300 | B | C500 |
|---|---|---|---|---|
| Thickness, Microns | 20 | 21 | 25 | 24.5 |
| Gurley | 15 | 19 | 21 | 18 |
| IR, ohm-cm2 | 1.7 | 2.1 | 2.0 | 2.3 |
| P.S. Grams | 337 | 367 | 412 | 424 |
| MP % deviation from 2300 | −10 | −2 | 0 | 5 |
| TD Tensile strength kgf/cm2 | 165 | 180 | 168 | 174 |
| Porosity % | 43 | 35 | 42 | 37 |
| Net Shrinkage @ 105°, 6 hr % | 6.4 | 3.0 | 6.4 | 2.7 |

Figure 5:
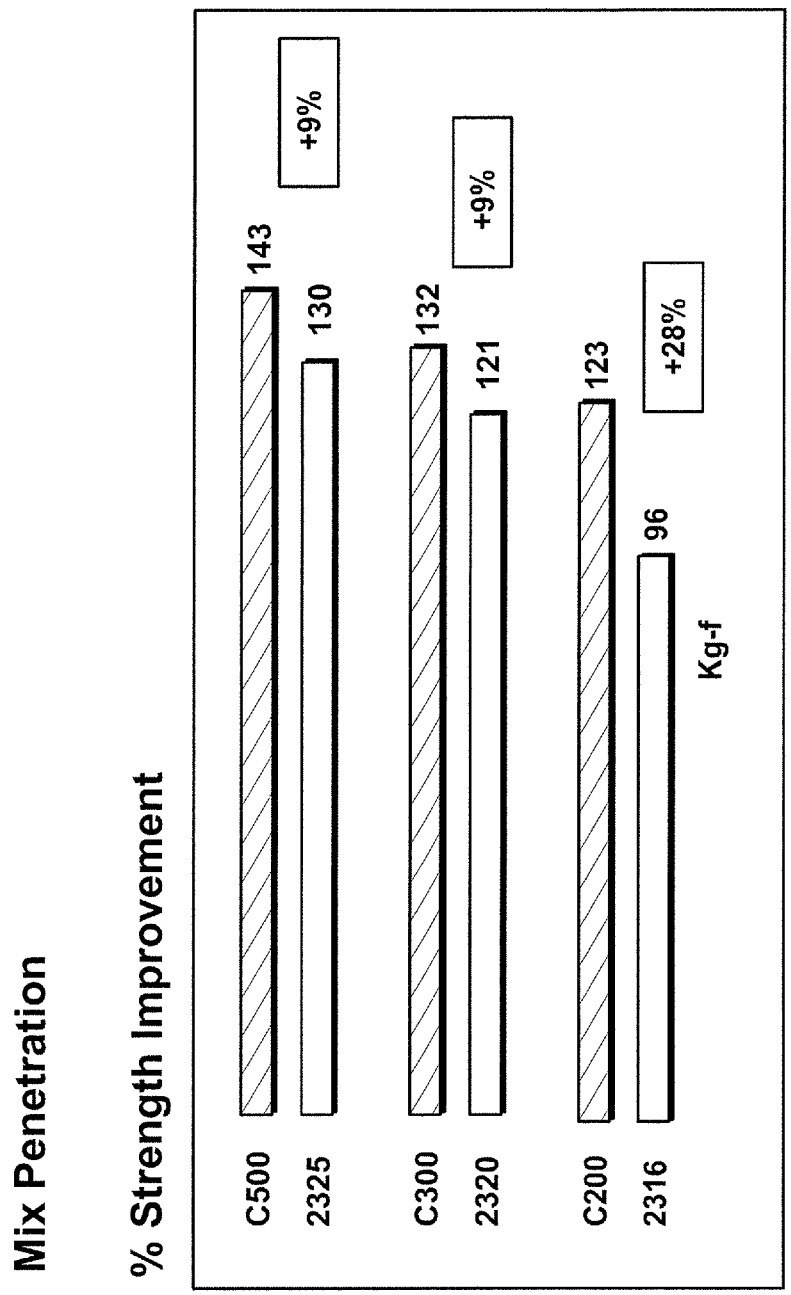
FIG. 5 is a graph of the percentage increase in mixed penetration strength of the multilayer membranes made by the current process of multilayer dry stretch membranes of the same thickness.

In the mixed penetration test, the invented material is compared against a trilayer separator made by the Celgard® process which does not use a high molecular weight polypropylene and is not made in accordance with the process of the invention. In FIG. 5 the improvement in mixed penetration strength can be seen. Also see table A, where the a standard 20 micron separator shows a 10% reduction in mixed penetration strength compared to a standard 25 micron trilayer separator. The 20 micron invented separator made by the invented process shows only a 2% reduction in mixed penetration strength. The standard 25 micron separator shows no change in mixed penetration strength, where the 25 micron separator made by the invent process shows an increase in mixed penetration strength of 5%.

What is claimed is:

1. A multi-layer microporous battery separator comprising:
   a high molecular weight polypropylene layer having a melt flow index (MFI) of <1.0 g/10 minutes;
   a polyethylene layer;
   a high molecular weight polypropylene layer having a melt flow index of <1.0 g/10 minutes;
   which forms a microporous battery separator by a dry stretch process, where said microporous battery separator has a porosity of ≦37% while maintaining a Gurley from 13 to 25 seconds, a thickness of ≦25 microns, said microporous battery separator exhibits an increase of 5% or more in mixed penetration strength compared to a tri-layer dry-stretched microporous battery separator of the same thickness and does not use said high molecular weight polypropylene, a net shrinkage of said microporous battery separator is less than 5% measured for 6 hours at 105° C., and an ionic resistance of said microporous battery separator is less than 2.5 ohms-cm$^2$
   made by a process for the preparation of a multi-layer microporous battery separator comprising the steps of:
   providing a polypropylene having a MFI≦1.0 measured at pellet before processing and a polyethylene;
   extruding said high molecular weight polypropylene to form a precursor polypropylene film;
   extruding said polyethylene to form a precursor polyethylene film;
   laminating said precursor polypropylene films to each side of said precursor polyethylene film to form a non-porous tri-layer precursor;
   annealing said non-porous tri-layer precursor;
   stretching said non-porous tri-layer precursor to form a stretched microporous tri-layer film;
   allowing a relaxation of said stretched microporous tri-layer film to form a microporous tri-layer film; and
   where net stretch of said microporous tri-layer film is less than 90%.

2. The multi-layer microporous battery separator according to claim 1, where the polyethylene layer is a high density polyethylene.

* * * * *